UNITED STATES PATENT OFFICE.

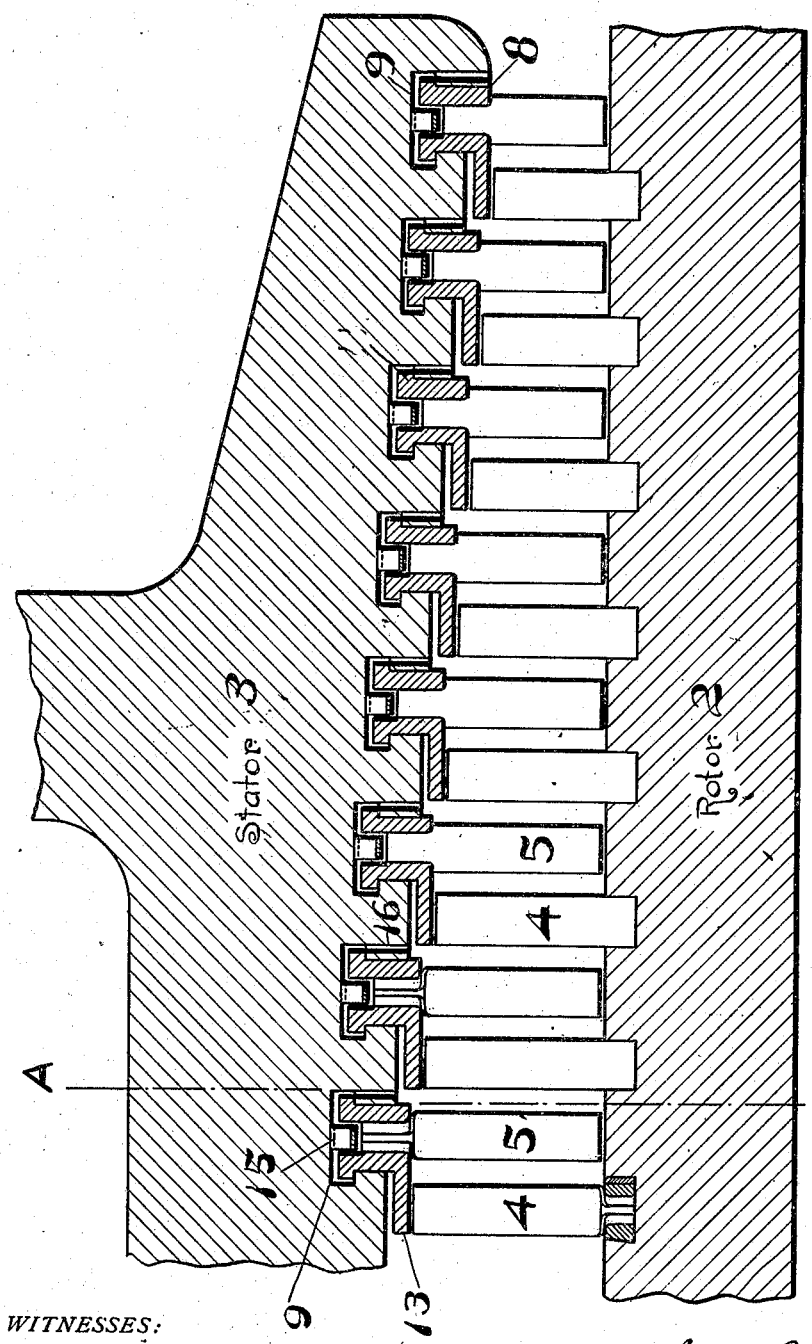

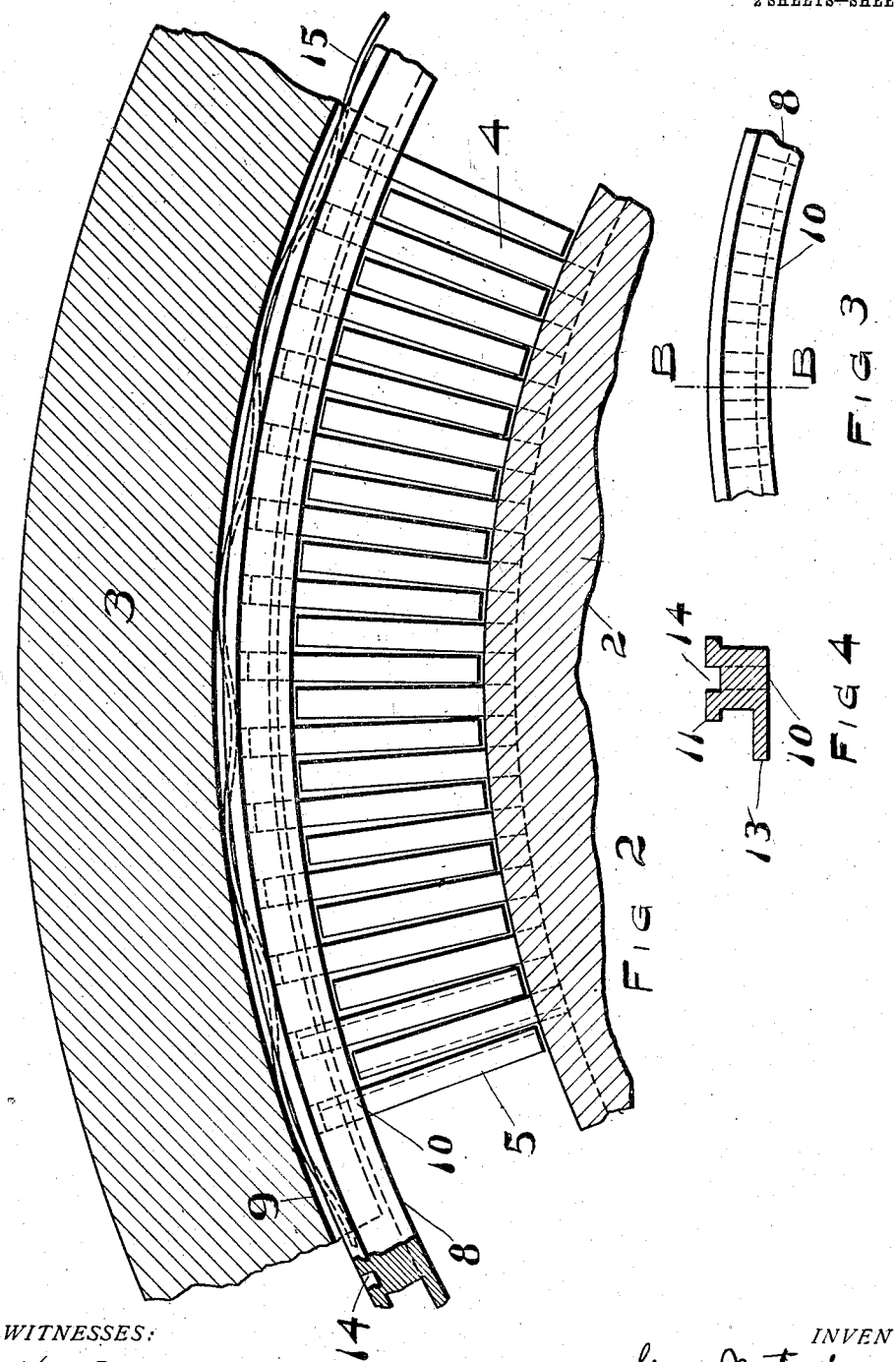

GEORGE WESTINGHOUSE, OF PITTSBURG, PENNSYLVANIA.

ELASTIC-FLUID TURBINE.

No. 930,908.  Specification of Letters Patent.  Patented Aug. 10, 1909.

Application filed August 9, 1907. Serial No. 387,825.

*To all whom it may concern:*

Be it known that I, GEORGE WESTINGHOUSE, a citizen of the United States, and a resident of Pittsburg, in the county of Allegheny and State of Pennsylvania, have made a new and useful Invention in Blade-Holding Means for Elastic-Fluid Turbines, of which the following is a specification.

This invention relates to elastic fluid turbines and more particularly to holding means for the stationary blades of such machines.

It has been found under certain operating conditions, that the rotors and stators of elastic-fluid turbines distort and thereby destroy the small clearance necessary for efficient operation of the turbine. These distortions may result from variations in temperature throughout the working passages of the turbine and an inequality of temperature strains throughout the length of the turbine. Inherent strains may be set up within the casing or stator by calking the blades in place which under the influence of the temperature will cause the stator to warp or distort. These distortions in conjunction with a tendency on the part of the rotor to rotate about the gravity axis instead of the geometric axis are apt to destroy the small clearances necessary for an efficient operation of the turbine and to damage and in some cases even completely wreck the turbine.

An object of this invention has been to overcome the troubles which arise from the necessarily small clearances and the above mentioned distortions of the rotors and stators of turbines.

A further object of this invention has been the production of a blade holding element for the stator blades of the turbine which obviates the necessity of calking the blades in place in the stator and thereby decreases the tendency of the stator to distort.

I accomplish these objects by mounting the stationary blades in the turbine casing in such a manner that they are capable of moving radially to accommodate themselves to variations in the relative positions of the rotor and stator of the turbine, and in also providing a clearance determining strip for the outer or free ends of the rotating blades, which will move with the stationary blades to accommodate itself to the varying positions of the relatively rotating parts.

In the drawings accompanying this application and forming a part thereof: Figure 1 is a fragmentary section through a rotor and stator of a turbine embodying my invention; Fig. 2 is a fragmentary section along the line A—A of Fig. 1; Fig. 3 is a partial side elevation of a blade holding ring forming a detail of my invention; and Fig. 4 is a section along the line B—B of Fig. 3.

The turbine illustrated as embodying my invention comprises a rotor 2, a stator or inclosing casing 3 therefor and alternate rows of moving and stationary blades 4 and 5, which are respectively mounted on the rotor and stator of the turbine. The moving blades 4 are secured, in any suitable manner, in grooves or slots provided for that purpose in the rotor. The stationary blades 5 are secured to arc shaped base pieces 8 which are secured in place in T shaped channels or grooves 9 formed in the stator 3. The base pieces 8 are rolled or drawn to the desired section and are preferably cut into semi-circular segments, each of which is provided with a row of radially extending holes 10, into which the stationary blades are mounted in any suitable manner. Each semi-circular base piece is provided at either side with axially extending circumferential flanges 11 which coöperate with the wider portion of the T-shaped channels in securing the base piece in place on the stator. A larger circumferential flange 13 is formed on the portion of each base piece which projects beyond the T-shaped channel and it is adapted to extend axially of the turbine into close proximity and in line with the free ends of an adjacent row of moving blades, thereby forming a clearance-determining strip for the blades and a protective strip for the blade-carrying element.

The body portion of each base piece 8 is adapted to slidably fit the narrower portion of one of the T-shaped grooves 9 and the flanges 11 are so formed that they fit freely into the wider portion of the channel. The depth of each channel is sufficient to permit transverse motion of a base piece in a plane perpendicular to the axis of the turbine rotor.

The flange 13 is of such width that it extends over the ends of an adjacent row of revolving blades when the base piece is mounted in one of the slots 9. The inner face of each base piece 8 is provided with a rectangular groove 14, in which a flat spring 15 or plurality of flat springs are mounted. The spring 15 operates between the base piece and the inner wall of the channel 9 to yieldingly force the base piece, and consequently the blades secured thereto, and the clearance strip 13, into an operating position relative to the rotor and moving blades. The base piece is so constructed that when the flanges 11 are held by the spring 15 against the shoulders of the T shaped channel the stationary blades will project into close proximity with the turbine rotor and maintain a desired clearance. The clearance strip 13 is so located that it projects into close proximity with its corresponding row of moving blades and maintains a clearance equal to that between the stationary blades and the moving rotor. With such a construction, if for any reason the relative positions of the rotor and stator are disturbed and the clearances, which it is desired to maintain, are destroyed by the rotor contacting with the free ends of the stationary blades or the stator coming in contact with the free ends of the rotating blades, the base piece 8 will move radially outward under the influence of the contacting force and flattening a number of the springs 15, prevent any serious results, the free ends of the stationary blades being yieldingly held in contact with the rotor and the clearance strip 13 being in yielding contact with the outer and free ends of the rotating blades. By cutting the base pieces 8 into semi-circular segments or even into smaller segments a portion only of the stationary blades are disturbed by a displacement of the rotor or stator and the remaining stationary blades are held by their springs 15 to maintain as nearly as possible the desired working clearances. In order that the springs 15 may not be compelled to operate against the pressure of the motive fluid a series of holes 16 are provided in the stator which connect the wider portion of the T shaped channel with the working passage of the turbine. These holes admit motive fluid around the mounting piece 8 so that they are balanced with respect to the fluid pressure.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim is:

1. In an elastic fluid turbine, in combination with the rotor thereof carrying annular rows of blades, blade carrying members yieldingly mounted in the stator and each provided with a portion which extends in line with one of said rotor rows.

2. In an elastic fluid turbine, a rotor, annular rows of blades carried thereby, and blade carrying members yieldingly mounted in the stator and provided with clearance determining portions in line with said rotor rows.

3. In an elastic fluid turbine, a rotor, annular rows of blades carried thereby, and blade carrying elements yieldingly mounted in the stator and each provided with a clearance determining flange lying in the path of one of said rotor rows.

4. In an elastic fluid turbine, a rotor, annular rows of blades carried thereby, in combination with a blade carrying member, mounted in the turbine stator and provided with a flange which extends axially of the turbine into line with one of said rotor rows, and a plurality of springs for yieldingly holding said stationary blades in the normal operative position.

5. In an elastic fluid turbine, a rotor, annular rows of blades carried thereby, in combination with a segmental blade carrying member mounted in a groove provided in the turbine stator, and provided with a flange which extends axially of the turbine into line with one of the said rotor rows, and a plurality of springs yieldingly holding said stationary blades in the normal operative position.

6. In combination with a turbine blade-carrying element provided with a slot, a plurality of blades, a base strip to which said blades are secured, means for securing said strip in said slot, a longitudinally-extending flange formed integrally with said strip and projecting out of said slot and means for exerting an outward pressure of said means.

7. In combination with a turbine blade-carrying element provided with a slot, a plurality of blades, a base strip to which said blades are secured, means for yieldingly securing said strip in said slot and a longitudinally extending flange formed integrally with said strip and projecting out of said slot.

8. In combination with a turbine-blade-carrying element provided with a slot, a base strip provided with a plurality of alined apertures, blades provided with base portions to fit said apertures, means for securing said blades into said apertures and a flange formed integrally with said strip and extending into close proximity with the peripheral face of said element.

9. In combination with a turbine blade-carrying element, blades, a segmental base strip for said blades provided with a circumferentially-extending, laterally projecting protective flange for the blade-carrying element and yielding means interposed between the strip and blade-carrying element.

10. In combination with a turbine blade-carrying element, blades, a segmental base strip for said blades, means for securing said blades thereto, a circumferentially extending and laterally projecting protective flange for said element formed on said strip and means for yieldingly securing said strip to said element.

11. In combination with a turbine, a blade-carrying element provided with a blade-mounting slot, blades, a base strip for the blades provided with a circumferentially extending and laterally projecting flange, and means for yieldingly securing said base strip into said slot whereby said flange projects from said slot into close proximity with the peripheral face of said element.

12. In combination in a turbine, a plurality of blades, a yieldingly supported base strip for the blades, and a protective strip formed integrally therewith.

13. The blade-carrying element of a turbine having a slot, a blade-securing means in said slot extending into a recess in said slot and an element protector extending laterally from said blade-securing means.

14. In a turbine, a blade-carrying element provided with a slot having a recess, a blade-securing means in the slot and having a portion extending in the recess and a protector for said element.

In testimony whereof, I have hereunto subscribed my name this 6th day of August, 1907.

GEO. WESTINGHOUSE.

Witnesses:
CHARLES W. McGHEE,
E. W. McCALLISTER.